United States Patent
Hayashida et al.

(10) Patent No.: US 12,461,544 B2
(45) Date of Patent: Nov. 4, 2025

(54) INFORMATION PROCESSING SYSTEM, WORK MACHINE, AND PROGRAM

(71) Applicant: YAMABIKO CORPORATION, Tokyo (JP)

(72) Inventors: Tomohiro Hayashida, Hiroshima (JP); Ichiro Nishizaki, Hiroshima (JP); Daisuke Ishihira, Tokyo (JP)

(73) Assignee: YAMABIKO CORPORATION (JP)

( * ) Notice: Subject to any disclaimer, the term of this patent is extended or adjusted under 35 U.S.C. 154(b) by 126 days.

(21) Appl. No.: 18/563,231

(22) PCT Filed: May 28, 2021

(86) PCT No.: PCT/JP2021/020544
§ 371 (c)(1),
(2) Date: Nov. 21, 2023

(87) PCT Pub. No.: WO2022/249486
PCT Pub. Date: Dec. 1, 2022

(65) Prior Publication Data
US 2024/0272645 A1 Aug. 15, 2024

(51) Int. Cl.
*G05D 1/06* (2006.01)
*A01D 34/00* (2006.01)
(Continued)

(52) U.S. Cl.
CPC ........... *G05D 1/646* (2024.01); *A01D 34/008* (2013.01); *G05D 1/622* (2024.01); *G05D 1/644* (2024.01);
(Continued)

(58) Field of Classification Search
CPC ........ G05D 1/646; G05D 1/622; G05D 1/648; G05D 1/644; G05D 2105/15; G05D 2101/15; A01D 34/008; A01D 2101/00
(Continued)

(56) References Cited

U.S. PATENT DOCUMENTS

2019/0213438 A1   7/2019  Jones et al.
2019/0320580 A1*  10/2019  Haneda ................ A01D 34/008
(Continued)

FOREIGN PATENT DOCUMENTS

DE    10307794 A1   9/2004
JP    H10-234634 A   9/1998
(Continued)

OTHER PUBLICATIONS

European Search Report issued in the corresponding European Patent Application No. 21943123.6; dated Feb. 29, 2024 (total 8 pages).

(Continued)

*Primary Examiner* — Mahmoud S Ismail
(74) *Attorney, Agent, or Firm* — Harness, Dickey & Pierce, P.L.C.

(57) ABSTRACT

An information processing system is provided which can increase the possibility that a path along which work quality is high is set in a work area. In an acquisition step of the information processing system, boundary information is acquired, the boundary information indicating the boundary of the work area targeted by a work machine that can travel autonomously. In a setting step, a path of the work machine is set in order to minimize unreached areas from the work area on the basis of the acquired boundary information, and when the work quality in the case of using a path set by a first method does not meet a prescribed criterion, a path is set by a second method.

19 Claims, 14 Drawing Sheets

(51) Int. Cl.
  *G05D 1/622* (2024.01)
  *G05D 1/644* (2024.01)
  *G05D 1/646* (2024.01)
  *G05D 1/648* (2024.01)
  *A01D 101/00* (2006.01)
  *G05D 101/15* (2024.01)
  *G05D 105/15* (2024.01)

(52) U.S. Cl.
  CPC .......... *G05D 1/648* (2024.01); *A01D 2101/00* (2013.01); *G05D 2101/15* (2024.01); *G05D 2105/15* (2024.01)

(58) Field of Classification Search
  USPC .......................................................... 701/25
  See application file for complete search history.

(56) References Cited

U.S. PATENT DOCUMENTS

| | | | |
|---|---|---|---|
| 2020/0275604 A1* | 9/2020 | Chen | G01S 19/43 |
| 2020/0347581 A1* | 11/2020 | Shimamura | G06V 20/188 |
| 2021/0018927 A1 | 1/2021 | Ackerman et al. | |
| 2021/0259497 A1* | 8/2021 | Park | B25J 11/0085 |
| 2023/0172090 A1* | 6/2023 | Yamaguchi | G05D 1/0212 |
| | | | 701/23 |
| 2023/0221720 A1* | 7/2023 | Pjevach | B60L 53/30 |
| | | | 56/10.2 A |

FOREIGN PATENT DOCUMENTS

| | | |
|---|---|---|
| JP | 2018-038291 A | 3/2018 |
| JP | 2018-108040 A | 7/2018 |
| JP | 2018-109849 A | 7/2018 |
| JP | 2019-121364 A | 7/2019 |
| JP | 2020-524330 A | 8/2020 |
| WO | 2002/023297 A1 | 3/2002 |
| WO | 2019-167205 A1 | 9/2019 |
| WO | 2020/012944 A1 | 1/2020 |

OTHER PUBLICATIONS

International Search Report of the International Searching Authority, issued in PCT/JP2021/020544, mailed Jul. 20, 2021; ISA/JP, (5 pages).

Office Action issued in the corresponding Japanese Patent Application No. 2023-523940; mailed on Sep. 10, 2024 (total 12 pages).

Office Action issued in the corresponding Japanese Patent Application No. 2023-523940; mailed on Nov. 19, 2024 (total 12 pages).

* cited by examiner

FIG. 9

| WORK TARGET AREA A10 | NUMBER OF STEPS | | | PROCESSING TIME (SECOND) |
|---|---|---|---|---|
| | MINIMUM | MUXIMUM | AVERAGE | AVERAGE |
| FIRST ROUTE SETTING METHOD | 2353.0 | 8139.0 | 2752.3 | 984.7 |
| SECOND ROUTE SETTING METHOD | 2366.0 | 30076.0 | 17243.6 | 1406.8 |

FIG. 14

| WORK TARGET AREA A20 | NUMBER OF STEPS | | | PROCESSING TIME (SECOND) |
|---|---|---|---|---|
| | MINIMUM | MAXIMUM | AVERAGE | AVERAGE |
| FIRST ROUTE SETTING METHOD | 2433.0 | 8059.8 | 2908.3 | 7458.3 |
| SECOND ROUTE SETTING METHOD | 2386.7 | 30054.7 | 17131.2 | 85616.8 |
| FIRST+SECOND ROUTE SETTING METHOD | 2460.7 | 12881.7 | 5580.8 | 50605.1 |

INFORMATION PROCESSING SYSTEM, WORK MACHINE, AND PROGRAM

CROSS REFERENCE TO RELATED APPLICATIONS

This application is a 371 U.S. National Phase of International Application No. PCT/JP2021/020544, filed on May 28, 2021. The entire disclosure of the above application is incorporated herein by reference.

TECHNICAL FIELD

The present invention relates to an information processing system, a work machine, and a program.

RELATED ART

As a technique for performing work such as mowing in a predetermined area, U.S. Publication No. 2021/0018927 discloses a technique for controlling operation of a robot mower in a worksite area by identifying a virtual marker in an image and generating boundary data representing a boundary of the worksite.

In an autonomous work machine such as the robot mower described in U.S. Publication No. 2021/0018927, human labor can be saved when a route to be traveled in the work is also set automatically. However, there are work areas having various shapes and sizes and including obstacles at various positions, and therefore work quality may be greatly lowered depending on the work route. For example, when the shape of the work area is intricate etc., the route setting becomes more complex, and therefore a heavy load occurs on a processing apparatus that learns an optimal route. However, when the load on the processing apparatus is reduced and thereby priority is given to processing speed, route setting needs to be simplified, which causes reduction of accuracy in the route setting. Specifically, an unreached area (unmown area) of the work machine may be increased by the work machine following a wasteful overlapping route, or it may take a longer time to complete the work in the same area, etc.

In view of the above circumstances, the present invention provides an information processing system, etc. capable of improving a likelihood that a route with high work quality is set in a work area.

SUMMARY

According to an aspect of the present invention, an information processing system is provided. In this information processing system, an acquisition step acquires boundary information representing a boundary of a work area targeted by an autonomous work machine. A setting step sets, based on the acquired boundary information, a route of the work machine for minimizing an unreached area in the work area, and, when work quality of a case where the route set by a first method is used does not satisfy a predetermined standard, setting the route by a second method.

According to such an aspect, it is possible to improve a likelihood that a route with high work quality is set in a work area.

BRIEF DESCRIPTION OF DRAWINGS

FIG. 9 is a diagram illustrating a processing load in a work target area A10.

FIG. 14 is a diagram illustrating the processing load in the second example.

DETAILED DESCRIPTION

Hereinafter, a description will be given of an embodiment of the present disclosure with reference to drawings. Various features described in the following embodiment can be combined with each other.

A program for realizing a software described in the present embodiment may be provided as a non-transitory computer-readable memory medium, may be provided to be downloaded via an external server, or may be provided so that the program is launched on an external computer and the program's function is realized on a client terminal (that is, the function is provided by so-called cloud computing).

A term "unit" in the present embodiment may include, for example, a combination of a hardware resource implemented as circuits in a broad sense and information processing of software that can be concretely realized by the hardware resource. Furthermore, various types of information are described in the present embodiment, and such information may be represented by, for example, physical values of signal values representing voltage and current, high and low signal values as a set of binary bits consisting of 0 or 1, or quantum superposition (so-called qubits), and communication and computation may be executed on a circuit in a broad sense.

The circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD), a complex programmable logic device (CLPD), field programmable gate array (FPGA)), and the like.

1. Hardware Configuration

This section describes a hardware configuration of an autonomous lawn mowing robot as a work machine according to the present embodiment. That is, in the present embodiment, the work performed by the work machine is lawn mowing. The work machine is an autonomous work machine and includes each unit of an information processing system for controlling operation pertaining to the work (lawn mowing).

Figure 1:
FIG. 1 is a diagram illustrating an appearance of a lawn mowing robot 1.

FIG. 1 is a diagram illustrating an appearance of the lawn mowing robot 1. The lawn mowing robot 1 includes, inside a housing, a blade disk, a tire, motors for rotating those, a battery, etc. In the lawn mowing robot 1, a driving motor allows traveling on a field of grass, while a work motor allows the blade disk to rotate and thereby to mow grass to a predetermined height. The lawn mowing robot 1 sets its own travel route in the field using its above-mentioned information processing system and mows lawn while traveling on the set travel route.

Figure 2:
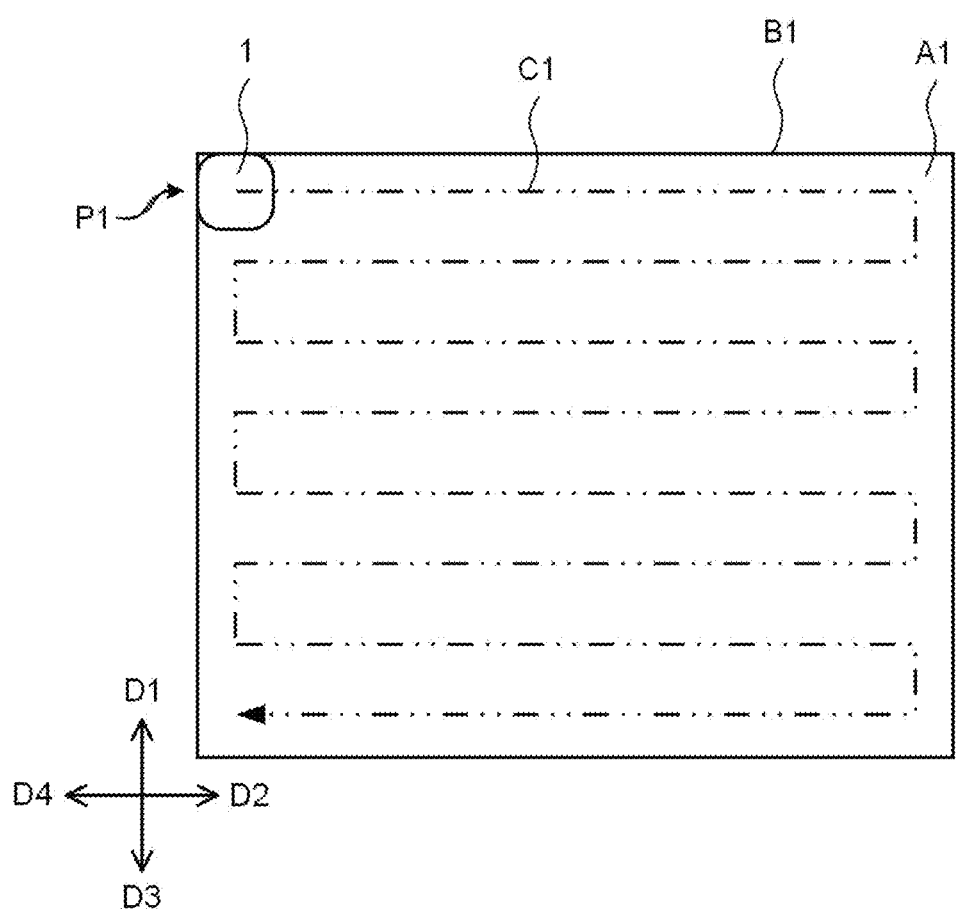
FIG. 2 is a diagram illustrating an example of a travel route of the lawn mowing robot 1.

FIG. 2 is a diagram illustrating an example of a travel route of the lawn mowing robot 1. FIG. 2 illustrates a rectangular shaped work target area A1. In FIG. 2, a direction D1 and a direction D3 along a short side of the work target area A1 and a direction D2 and a direction D4 along a long side of the work target area A1 are represented. The work target area A1 has a boundary B1 that serves as a boundary between inside and outside of the area. In the work target area A1, a wire is buried along the boundary B1.

By recognizing the position of the wire in two-dimensional or three-dimensional space, the lawn mowing robot 1 recognizes shape and size formed by the boundary B1, i.e., shape and size of the outer perimeter of the work target area A1. The lawn mowing robot 1 sets a traveling route based on the shape and size of the recognized work target area A1. The lawn mowing robot 1 sets a work route C1 in the example illustrated in FIG. 2. The work route C1 has a start point P1 at a corner in the direction D1 and the direction D4 of the work target area A1.

The work route C1 is a route starting from the start point P1 in the direction D2, changing its direction to the direction D3 when reaching the boundary B1, traveling by a length of a width of the lawn mowing robot 1, and then changing its direction again in the direction D4. The work route C1 is thus a route for, by the two directional changes, turning around along the traveled route. The moving direction during the turning around (in this case, the direction D3) is hereinafter referred to as "turning around direction".

The work route C1 is a route for thereafter traveling in the direction D4 and, when reaching the boundary B1, turning around to the direction D2 with the direction D3 as the turning around direction. The work route C1 is a route for traveling repeatedly in the direction D2 and the direction D4 while shifting slightly in the direction D3 as the turning around direction. A description will be given later of the details of how the work route is set.

Figure 3:
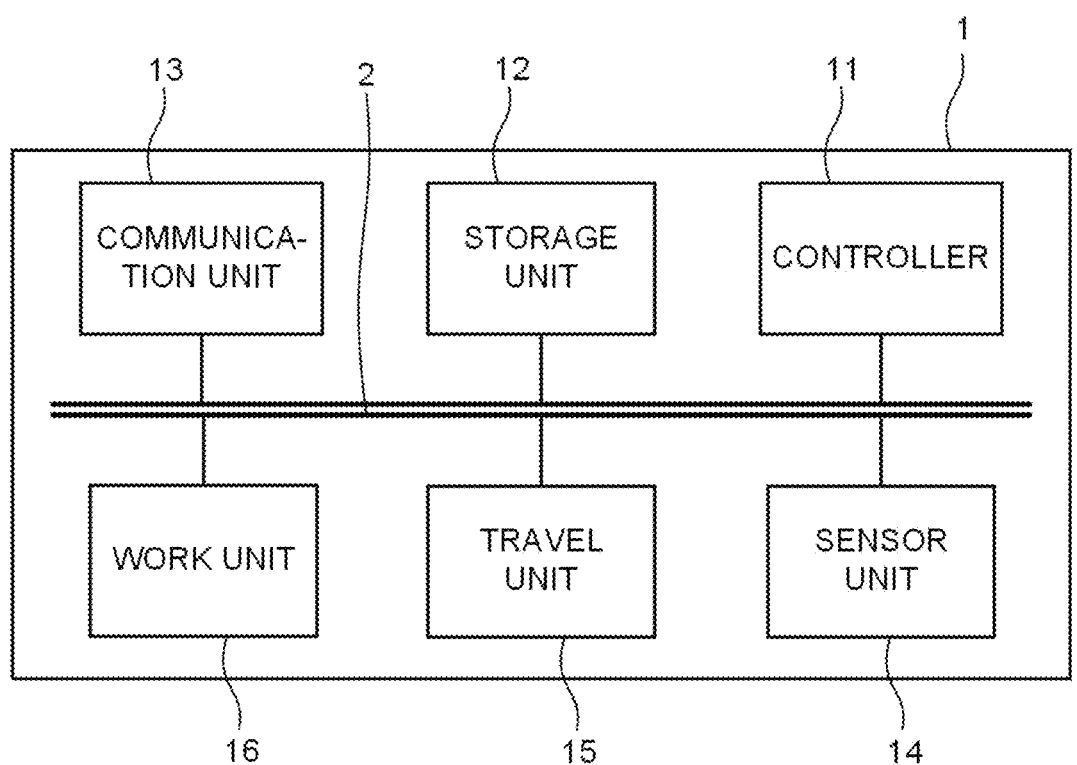
FIG. 3 is a diagram illustrating a hardware configuration of the lawn mowing robot 1.

FIG. 3 illustrates a hardware configuration of the lawn mowing robot 1. The lawn mowing robot 1 includes a controller 11, a storage unit 12, a communication unit 13, a sensor unit 14, a travel unit 15, and a work unit 16.

Controller 11

The controller 11 is, for example, an unillustrated central processing unit (CPU). The controller 11 reads a predetermined program stored in the storage unit 12 and thereby realize various functions pertaining to the lawn mowing robot 1. In other words, information processing by software stored in the storage unit 12 is specifically realized by the controller 11 as an example of hardware and thereby executed as each functional unit included in the controller 11. These are described in more detail in the next section. The controller 11 is not limited to a single controller but may be implemented as two or more controllers 11 for each function. A combination thereof may also be adopted.

Storage Unit 12

The storage unit 12 stores various information as defined by the above description. The storage unit 12 may be implemented, for example, as a storage device such as a solid state drive (SSD), etc. configured to store various programs, etc. pertaining to the lawn mowing robot 1 and executed by the controller 11 or as a memory such as a random access memory (RAM), etc. configured to store temporarily necessary information (arguments, sequences, etc.) pertaining to program operations. The storage unit 12 stores various programs, variables, etc. pertaining to the lawn mowing robot 1 executed by the controller 11.

Communication Unit 13

The communication unit 13 is configured to transmit various electrical signals from the lawn mowing robot 1 to an external component. The communication unit 13 is further configured to receive various electrical signals from the external component to the lawn mowing robot 1. The communication unit 13 may have a network communication function, and thereby various types of information may be communicated between the lawn mowing robot 1 and an external apparatus via a network such as internet, etc.

Sensor Unit 14

The sensor unit 14 includes a group of sensors configured to measure various values used by the lawn mowing robot 1 as parameters for processing. The sensor unit 14 includes, for example, a position sensor, an orientation sensor, an angular velocity sensor, an acceleration sensor, a blade disk torque sensor, a wire detection sensor, an object detection sensor, etc. The position sensor measures the position of the lawn mowing robot 1 by the global positioning system (GPS) or the like. The orientation sensor measures the orientation of the lawn mowing robot 1. The angular velocity sensor measures the angular velocity of the lawn mowing robot 1 when the lawn mowing robot 1 rotates. The acceleration sensor measures the acceleration of the lawn mowing robot 1. The blade disk torque sensor detects the load on the motor caused by the rotation of the lawn mowing blade. Based on this detected value, the above-mentioned controller 11 calculates an estimated work amount of the blade disk. The wire detection sensor detects the wire buried at the boundary B1 in FIG. 2, etc. The object detection sensor emits extremely high frequency waves or the like and detects an object reflecting the waves.

Travel Unit 15

The travel unit 15 includes the tire, the motor, and the like and allows the lawn mowing robot 1 to travel. Under control of the controller 11, the travel unit 15 executes straight ahead travel, backward travel, directional change, etc.

Work Unit 16

The work unit 16 includes the blade disk, the motor, and the like and, under control of the controller 11, rotates the blade disk to mow the lawn.

2. Functional Structure

This section describes a functional configuration according to the present embodiment. As described above, the information processing by software stored in the storage unit 12 is specifically realized by the controller 11 as an example of hardware so that each functional part included in the controller 11 can be executed.

Figure 4:
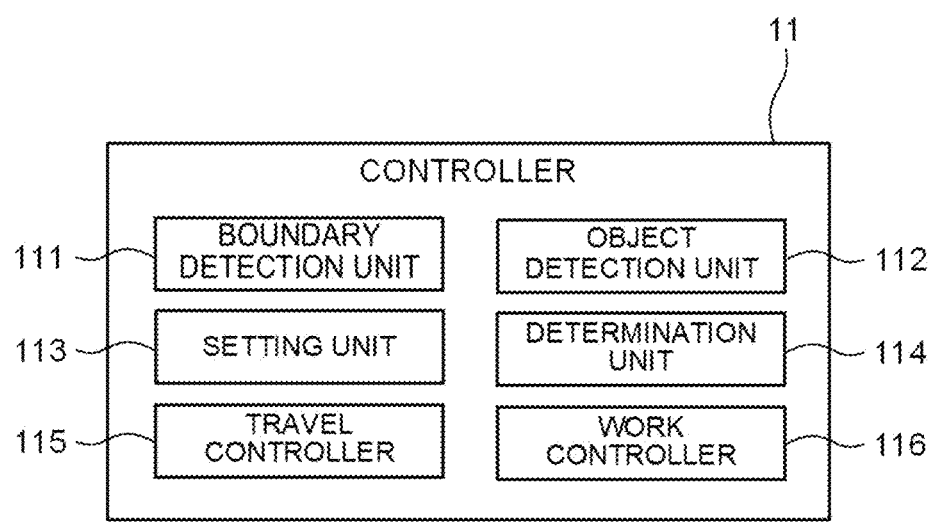
FIG. 4 is a diagram illustrating a functional configuration of the lawn mowing robot 1.

FIG. 4 is a diagram illustrating the functional configuration of the lawn mowing robot 1. The lawn mowing robot 1 includes a boundary detection unit 111, an object detection unit 112, a setting unit 113, a determination unit 114, a travel controller 115, and a work controller 116. The boundary detection unit 111 detects a boundary of a work target area as a target of work by the lawn mowing robot 1. For example, in the example illustrated in FIG. 2, the boundary detection unit 111 first detects the wire buried along the outer perimeter of the work target area A1. The boundary detection unit 111 detects the wire using, for example, a well-known technique used in autonomous driving by a wire method as described in Japanese Patent Application Publication No. 2016-208950.

The boundary detection unit 111 detects the boundary B1 of the work target area A1 by traveling along the detected wire around the outer perimeter. The boundary detection unit 111 acquires detection result data represented by a set of coordinates in a two-dimensional or three-dimensional space of the detected boundary B1. The boundary detection unit 111 is an example of a function of executing the "acquisition step," and the detection result data is an example of the "boundary information. In this way, the boundary detection unit 111 (acquisition unit) in the information processing system acquires boundary information representing the boundary of the work area targeted by the autonomous lawn mowing robot 1 (work machine). The boundary detection unit 111 supplies the acquired detection result data to the setting unit 113.

The object detection unit 112 detects an object in the work area. The object detection unit 112 is an example of a function of executing the "detection step. The work target area may include an object (i.e., an obstacle) obstructing traveling of the lawn mowing robot 1. The obstacle is, for example, a natural object such as a stone and a rock, or an artificial object such as a tool left behind by a person. The object detection unit 112 also detects the wire buried along the boundary B1 as the obstacle. The object detection unit 112 is capable of detecting the object even when there is some distance from the object. The object detection unit 112 supplies object information on the position and direction of the detected object (obstacle) to the setting unit 113 and the travel controller 115.

The setting unit 113 sets the route of the work machine for minimizing (eliminating as much as possible) an unreached area in the work area based on the boundary information acquired by the boundary detection unit 111. The setting unit 113 is an example of a function of executing the "setting step". The setting unit 113 sets the work route in accordance with two methods of the below-described first route setting method and second route setting method in the present embodiment. Based on a trained model trained by a machine learning method, each of the first route setting method and the second route setting method sets a route.

The first route setting method uses a machine learning method using a neural network (NN) that can select a route from two or more types of patterned routes. The NN is a learning model having a network structure with multi layers including an input layer, an intermediate layer, and an output layer. In an NN, an algorithm such as backpropagation optimizes a plurality of model parameters inside the network by using training data representing a relationship between input data and output data, and thereby a trained model can be provided. In the present embodiment, the first route setting method is a method that learns a model for selecting an optimal one from a predetermined two or more action rules by the NN method and then sets a route based on the trained model.

The second route setting method uses a machine learning method using a classifier system. The classifier system is a set of rules (classifiers) including a condition part and an action part and is a system that learns appropriateness of the rules on the basis of results of actions output in response to input from an environment according to the above rules. In the present embodiment, the second route setting method is a method that learns a model for setting an optimal route by a neural-network eXtended classifier system (NXCS) by acquiring environmental information each travel of a certain distance and thereby sets a route based on the trained model. The NXCS is a classifier system supporting continuous-valued environments by using a neural network in match determination of the condition part.

Thus, by using neural network as the first route setting method, a process pertaining to route selection in a relatively simple terrain can be simplified and work efficiency can be improved. Furthermore, by using learning in conjunction with a classifier system as the second route setting method, the optimal route can be set even in situations that are difficult to handle with the first route setting method, and work can be executed in various terrains while efficiency and work quality are maintained. Here, the setting may be such that when it is determined that the work using the second route setting method is completed, the setting method is switched to the first route setting method. By combining the methods in this way, the features of first and second learning methods are maximally utilized, unnecessary processing load and processing time are removed, and thereby work efficiency is further improved.

The first route setting method is an example of the "first method" and the second route setting method is an example of the "second method". As described above, based on trained models respectively trained by different machine learning methods, NN and NXCS in the present embodiment, the first method and the second method set a route. By using machine learning in this way, more desirable work routes are set as the routes are repeatedly set.

When setting a route using the first route setting method, the setting unit 113 first sets the route using the boundary information supplied by the boundary detection unit 111. In detail, the setting unit 113 sets the route using the first method of setting a continuous route in accordance with a rule whereby the work machine repeats travel and a directional change at the boundary of the work area. By using such a rule, even when the size of the work target area changes, it is possible to reduce a change in the processing load in setting the work route although the distance to be traveled or the number of turning around slightly increases.

The setting unit 113 sets the route using, as the first method, a method having a plurality of the rules that differ from each other in at least one of the initial traveling direction and the direction after the directional change, and selecting one that provides the best work quality in the plurality of the rules and thereby setting the route. The work quality refers to quality of the work performed by the lawn mowing robot 1 as a work machine. For example, when the lawn mowing robot 1 works for a certain period of time, the more areas where the work is completed, the higher the quality of the work.

That is, for example, in a case of after 30 minutes of work, work quality when mowing work is completed over the entire area is higher than work quality when mowing work is completed over only half of the area. The evaluation method for work quality is not limited to this. For example, the shorter the time required to complete the work over the entire area, the higher the work quality may be, or the shorter the distance traveled to complete the work over the entire area, the higher the work quality may be. In any case, in the present embodiment, by allowing the user to select one of the plurality of rules as described above, the work quality can be improved when the work route is set using the first route setting method, compared with a case with one fixed rule. The work quality after such a selection and setting for improving the work quality is much higher than the work quality with random traveling without any travel rules or learning function.

The plurality of rules are, for example, rules for using the direction along the long side and the direction along the short side respectively as the initial traveling direction and the turning around direction, as in the example in FIG. 2, when the work target area has a rectangle shape. The setting unit 113 uses the following four rules in the present embodiment:

Rule 1: Initial direction=direction D1, turning around direction=direction D4, direction of travel after turning around=D3, avoid obstacles;

Rule 2: Initial direction=direction D2, turning around direction=direction D3, direction of travel after turning around=D4, avoid obstacles;

Rule 3: Initial direction=direction D3, turning around direction=direction D2, direction of travel after turning around=D1, avoid obstacles; and Rule 4: Initial direction=direction D4, turning around direction=direction D1, direction of travel after turning around=D2, avoid obstacles.

The setting unit 113 selects a rule that will provide the highest work quality when selected at a start point of work of the work machine, and sets a route according to the selected rule. For example, when the start point is P1 in the work target area A1 represented in FIG. 2, rule 2 (initial direction=direction D2, turning around direction=direction D3) will provide the highest work quality because travel can be executed throughout A1. Therefore, the setting unit 113 selects rule 2 and thereby sets a work route C1. Even during traveling on the set work route, the setting unit 113 selects a rule that will provide the highest work quality every travel of, for example, a predetermined distance, and when the selected ruled changes at a position in the middle of the work route, the work route is reset with a new rule from that position.

The setting unit 113 sets the route according to an obstacle avoidance rule when the lawn mowing robot 1 travels along the work route set before the work. The setting unit 113 recognizes the presence of an obstacle on the work route by using object information supplied by the object detection unit 112. When the recognized obstacle can be bypassed, the setting unit 113 resets the work route so as to bypass the obstacle and return to the original work route. When the recognized obstacle cannot be bypassed (e.g., when the lawn mowing robot 1 reaches the boundary of the work target area before bypassing the obstacle and returning to the original work route), the setting unit 113 resets the work route so as to return to a point of where the bypassing started and turn around at that point.

As described above, when the setting unit 113 resets the work route by the first route setting method, the setting unit 113 uses one of the above rules 1 to 4 and the obstacle avoidance rule. The setting unit 113 also resets the work route when using the second route setting method, but the second route setting method differs from the first route setting method in not being restricted to any specific rule. Specifically, the setting unit 113 sets a route by using, as the second route setting method, a method of resetting, based on boundary information acquired by the boundary detection unit 111 and a position of an object detected by the object detection unit 112, the route each time the work machine travels a predetermined distance.

In a case where the second route setting method is used, when, for example, an obstacle is found in the middle of the route and the current route becomes impassable, the setting unit 113 sets a new optimal route. In other words, it may become possible that an area once made to be unreachable by an obstacle can be reachable via a newly set route. Thus, when the second route setting method is used, an unreached area decreases compared with a case where the first route setting method is used not changing once set route during traveling.

When setting a route by using the first route setting method, the setting unit 113 supplies route information representing the set route to the determination unit 114. The determination unit 114 determines whether or not a switch condition is satisfied for switching the route setting method from the first route setting method to the second route setting method. Specifically, the determination unit 114 makes a determination by using, as the switch condition, whether or not work quality when a route set by the first route setting method is used satisfies a predetermined standard.

For example, when a difference is less than a threshold value between a turning around position determined in the set route and a position where some object is hit during actual travelling, the determination unit 114 determines that the predetermined standard is met. Conversely, when the above-mentioned difference is equal to or greater than the threshold value, the determination unit 114 determines that the work quality does not satisfy the predetermined standard. A large deviation from a position when the set route is traveled along may be caused by, for example, an obstacle on the route, or the route being not flat but including slope or unevenness and making it impossible to travel straight.

In either case, the determination unit 114 determines that the work quality does not satisfy the predetermined standard because the work quality cannot be expected to be good on the set route. When determining that the work quality does not satisfy the predetermined standard, the determination unit 114 notifies the setting unit 113 of that effect. When the setting unit 113 receives the notification from the determination unit 114, that is, when the work quality of a case where the route set by the first route setting method is used does not satisfy the predetermined standard, a route is set by the second route setting method.

The travel controller 115 controls a traveling operation of the lawn mowing robot 1. The travel controller 115 acquires a position and direction of the lawn mowing robot 1 and controls the traveling operation of the lawn mowing robot 1 so as to allow it to travel forward or backward, change direction, etc. in a predetermined direction. The work controller 116 controls operation of the lawn mowing robot 1 during work. In the present embodiment, the work controller 116 controls the operation of mowing the lawn by rotating the blade disk during traveling. The lawn mowing robot 1 executes a route setting process for setting a route in a work target area by each of the above-mentioned functions.

Figure 5:
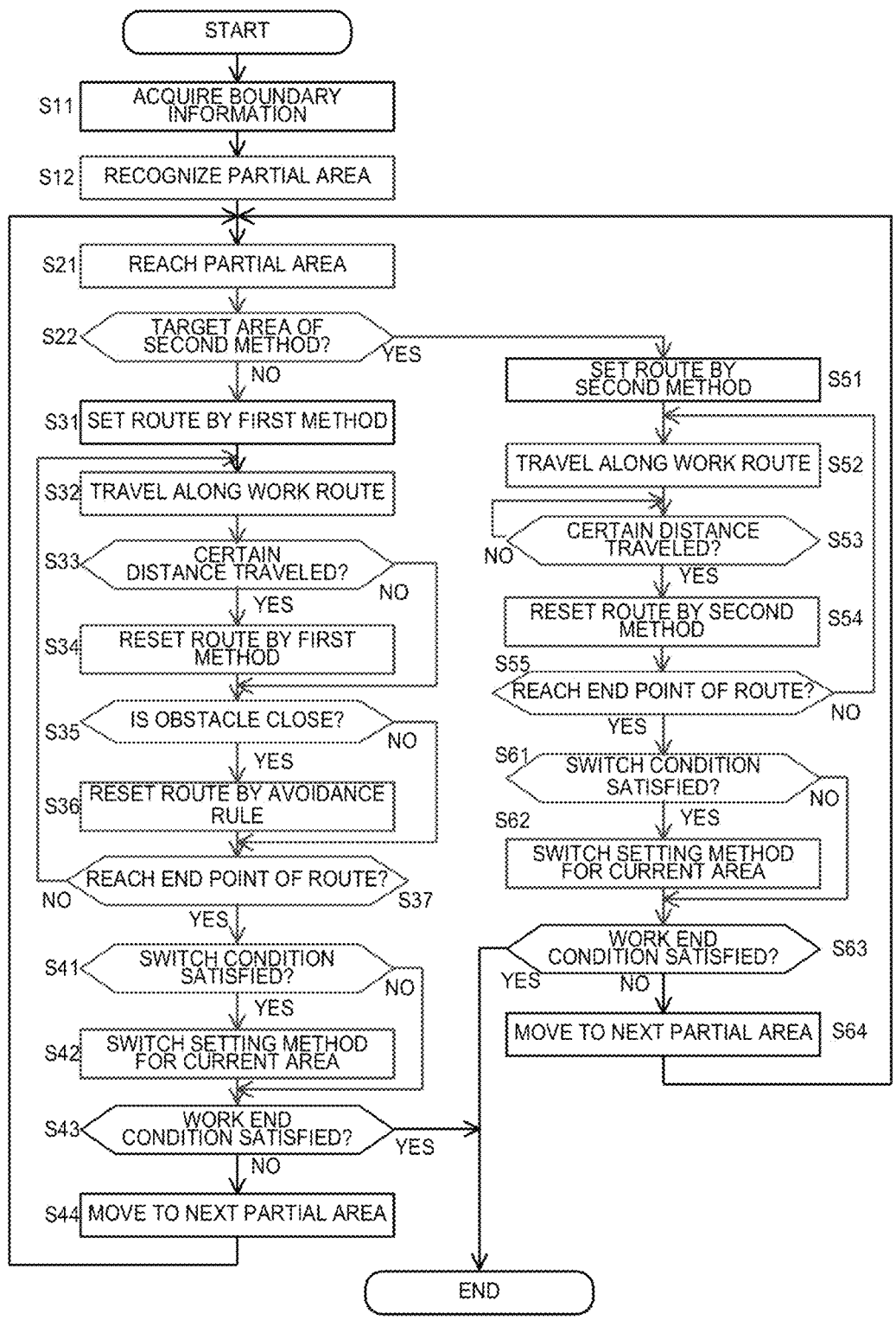
FIG. 5 is a diagram illustrating an operation procedure in a route setting process.

FIG. 5 is a diagram illustrating an operation procedure in the route setting process. The route setting process is triggered, for example, by disposing the lawn mowing robot 1 at a start point of a work target area. First, the lawn mowing robot 1 acquires boundary information representing a boundary of the work target area by the boundary detection unit 111 detecting, for example, wires buried along the perimeter of the work target area (Step S11). Subsequently, the lawn mowing robot 1 recognizes, for example, a portion of the work target area where a distance between boundaries facing each other is less than a threshold value as a "passageway".

The lawn mowing robot 1 then recognizes an area separated by the passageway as a "partial area" (step S12). Subsequently, the lawn mowing robot 1 travels to, by the travel controller 115, and reaches one of the recognized partial areas (step S21). The point reached by the lawn mowing robot 1 is a start point of work in that partial area. The lawn mowing robot 1 then determines, by the setting unit 113, whether or not the reached partial area is a target area of the second route setting method (step S22).

In a first work in a work target area, all partial areas are target areas of the first route setting method. Therefore, in the first work, the lawn mowing robot 1 determines by the setting unit 113 that the reached partial area is not a target area of the second route setting method (NO), and then based on the boundary information acquired in step S11, sets a work route for that partial area by the first route setting method (Step S31).

Subsequently, the lawn mowing robot 1 travels along the work route set in step S21 by the travel controller 115 (step S32). Next, the lawn mowing robot 1 determines whether or not the lawn mowing robot 1 has traveled a certain distance (step S33). When the lawn mowing robot 1 determines that the lawn mowing robot 1 has traveled the certain distance (YES), the lawn mowing robot 1 selects one of the rules 1 to 4 to resets the work route by the first route setting method (step S34). The lawn mowing robot 1 may set the certain distance to an infinite or very large number so as not to perform the resetting while working in the partial area.

Next, the lawn mowing robot 1 repeatedly perform, by the object detection unit 112, object detection to determine whether or not the lawn mowing robot 1 is close to an obstacle (step S35). The obstacle is an object approaching the lawn mowing robot 1, excluding the wires. The lawn mowing robot 1 makes this determination in step S35 also when the lawn mowing robot 1 determines in step S32 that the lawn mowing robot 1 has not traveled the certain distance (NO). When the lawn mowing robot 1 determines that the lawn mowing robot 1 is close to an obstacle (YES), the setting unit 113 and the travel controller 115 reset the work route for bypassing the obstacle (step S36) according to the obstacle avoidance rule.

The lawn mowing robot 1 then determines whether or not the lawn mowing robot 1 reaches an end point of the work route set in the current partial area (step S37). The lawn mowing robot 1 makes this determination in step S37 also when the lawn mowing robot 1 makes a determination of NO in step S35. When the lawn mowing robot 1 determines in step S37 that the lawn mowing robot 1 does not reach the end point of the work route (NO), the lawn mowing robot 1 returns to step S32 and repeats the operation. When the lawn mowing robot 1 determines in step S37 that lawn mowing robot 1 reaches the end point of the work route (YES), the lawn mowing robot 1 then determines whether or not the switch condition as a condition for switching the setting method for the current partial area is satisfied (step S41).

The switch condition is represented by whether or not the work quality when the route set by the first route setting method is used satisfies the predetermined standard. In the present embodiment, the switch condition is a condition satisfied when the number of positions is equal to or greater than a number threshold, the positions where a difference between a turning around position determined in the set route and a turning around position in actual traveling is equal to or greater than a distance threshold. For example, in a case where the number threshold is 1, when there is even one position where the difference between the set turning around position and the actual turning around position is equal to or greater than the distance threshold, the switch condition is satisfied.

When the lawn mowing robot 1 determines that the switch condition is satisfied (YES) in step S41, the lawn mowing robot 1 switches the work route setting method for the current partial area (step S42). For example, when the lawn mowing robot 1 determines to switch the method in the first work, the lawn mowing robot 1 stores that the setting method for the current partial area is switched from the first route setting method to the second route setting method. Next to step S42, or when the lawn mowing robot 1 determines in step S41 that the switch condition is not satisfied (NO), the lawn mowing robot 1 determines whether or not a work end condition is satisfied (step S43).

The work end condition is a condition for ending the work in the work target area by the lawn mowing robot 1. For example, the work end condition is satisfied when an amount of an unreached area in the work target area is less than 5% of the entire work target area. This work end condition is used for preventing an extreme increase in the difficulty of machine learning due to a small unmown area.

Figure 6:
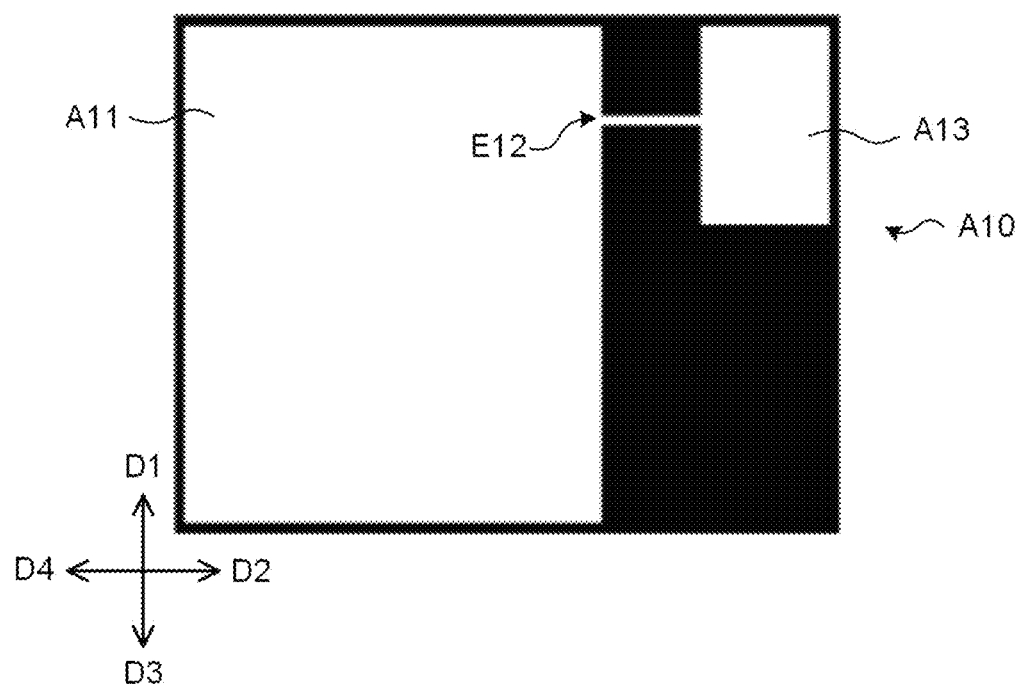
FIG. 6 is a diagram illustrating the first example of a work target area.

In a case where a work target area has a simple shape as in the examples illustrated in FIG. 2 and FIG. 6, little or no unmown area is left, and thus a value used as the work end condition may be smaller than 5% or may be set to 0%. Another method can be adopted that sets a value to be used as the work end condition at an initial value of, for example, 10%, and then reduce the value gradually or in a stepwise manner as a learning amount increases. According to this method, an optimal end condition is set depending on the learning contents without a need of detailed condition setting prior to the work.

When the lawn mowing robot 1 determines in step S43 that the work end condition is satisfied (YES), the lawn mowing robot 1 ends this operation procedure. When the lawn mowing robot 1 determines that the work end condition is not satisfied (NO), the lawn mowing robot 1, by using the setting unit 113 and the travel controller 115, sets a movement route for moving toward the next partial area via a passageway connected to the current partial area and moves along the set movement route to the next partial area (step S44).

Specifically, the lawn mowing robot 1 sets the movement route by using a rule 5 or rule 6 for movement.

Rule 5: Travel clockwise along a perimeter of a work target area, and when reaching an entrance to a passageway, travel along passageway, and when reaching the next partial area, turn to either the left or right and travel to a corner of that partial area.

Rule 6: Replace "clockwise" in the rule 5 with "counterclockwise".

The setting unit 113 selects one with a shorter travel distance to reach the passageway from the rule 5 and rule 6 and use the one for route setting.

After moving to the next partial area, the lawn mowing robot 1 returns to step S21 and then continues operation. The work sequence from the start in step S11 to the end in step S43 is referred to as "episode". Even after an end of one episode, when the grass grows overtime, the lawn mowing robot 1 starts the next episode. In a second and subsequent episodes, there may be a partial area that has been switched as a target area of the second route setting method.

In that case, the lawn mowing robot 1 determines by the setting unit 113 that the reached partial area is a target area of the second route setting method (YES), and then sets a work route for that partial area by the second route setting method, based on the boundary information acquired in step S11 (step S51). Subsequently, the lawn mowing robot 1 travels along the work route set in step S51 by the travel controller 115 (step S52). While traveling along the work route, the lawn mowing robot 1 allows the object detection unit 112 to repeatedly perform object detection.

Next, the lawn mowing robot 1 determines whether or not the lawn mowing robot 1 has traveled a certain distance (step S53), and repeats the operation in step S53 until the lawn mowing robot 1 determines that the lawn mowing robot 1 has traveled the certain distance (YES). When the lawn mowing robot 1 determines that the lawn mowing robot 1 has traveled the certain distance, the lawn mowing robot 1 resets the work route by the second route setting method (step S54), taking into account the information on an object having been detected. The lawn mowing robot 1 may determine in step S53 whether or not a close object is detected, and when the lawn mowing robot 1 determines that there is a close object (YES), the lawn mowing robot 1 may reset the work route by the second route setting method.

The lawn mowing robot 1 determines whether or not the lawn mowing robot 1 reaches an end point of the work route set in the current partial area (step S55). When the lawn mowing robot 1 determines in step S55 that the lawn mowing robot 1 does not reach the end point of the work route (NO), the lawn mowing robot 1 returns to step S52 and repeats the operation. When the lawn mowing robot 1 determines in step S55 that the lawn mowing robot 1 reaches the end point of the work route (YES), the lawn mowing robot 1 then determines whether or not a switch condition is satisfied in the current partial area (step S61). For example, the switch condition from the second route setting method to the first route setting method is a condition satisfied when every obstacle detected as an object other than boundaries is of a shape, position, and size that can be bypassed.

The obstacle conditions may be different in work performed on a different day, and thus this switch condition may be satisfied. When the lawn mowing robot 1 determines in step S61 that the switch condition is satisfied (YES), the lawn mowing robot 1 switches the method of setting the work route for the current partial area (step S62). Next to step S62, or when it is determined in step S61 that the switch condition is not satisfied (NO), the lawn mowing robot 1 determines whether or not the work end condition is satisfied (step S63).

When the lawn mowing robot 1 determines in step S63 that the work end condition is satisfied (YES), the lawn mowing robot 1 ends this operation procedure. When the lawn mowing robot 1 determines that the work end condition is not satisfied (NO), the lawn mowing robot 1, by using the setting unit 113 and the travel controller 115, sets a movement route for moving toward the next partial area via a passageway connected to the current partial area and moves along the set movement route to the next partial area (step S64). Hereinafter, a description will be given of examples for setting a work route by the route setting process.

FIG. 6 is a diagram illustrating a first example of a work target area. FIG. 6 represents a work target area A10 including a rectangular partial area A11 and a partial area A13 connected to the partial area A11 by a passageway E12. FIG. 6 includes the same directions D1-D4 as in FIG. 2.

Figure 7:
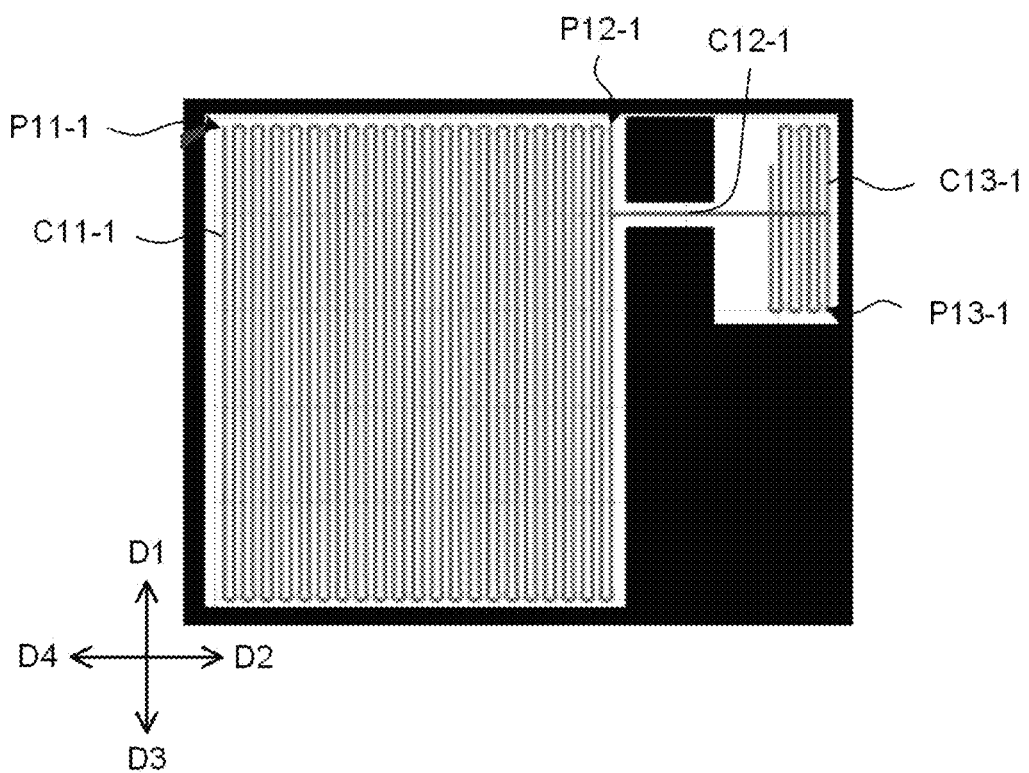
FIG. 7 is a diagram illustrating an example of a route set by the first route setting method.

FIG. 7 is a diagram illustrating an example of a route set by the first route setting method. In the example of FIG. 7, the setting unit 113 sets the work route with a corner in the direction D1 and the direction D4 of the partial area A11 as a start point P11-1. From the start point P11-1, the setting unit 113 sets the work route C11-1 according to the above-mentioned rule 3 (initial direction=direction D3, turning around direction=direction D2). In the work route C11-1, an end point P12-1 at an end of the partial area A11 is set as the end point of the work route.

When the end point of the work route is reached in this way, the setting unit 113 sets a movement route using the above-mentioned rule 5 or rule 6. In the case of the example in FIG. 7, a travel distance to the passageway E12 is shorter with the rule 5 than with the rule 6, and therefore the setting unit 113 uses the rule 5 to set a movement route C12-1 for traveling from the end point P12-1 to a position adjacent to the passageway E12 and, from that position, passing the passageway E12. The setting unit 113 also sets a movement route C12-1 for turning to the right when reaching a boundary of the partial area A13 and traveling to a corner in the direction D2 and the direction D3 of the partial area A13.

The lawn mowing robot 1 travels, by the travel controller 115, along the thus set movement route C12-1 and thereby moves to the partial area A13. The end point of the movement route C12-1 is a start point of the next work route P13-1. In the example of FIG. 7, the lawn mowing robot 1 sets, by the setting unit 113, a work route C13-1 starting from the start point P13-1 by using the rule 1 (initial direction=direction D1, turning around direction=direction D4). In this example, when an amount of an unreached area in the work target area is less than 5% of the entire work target area, the lawn mowing robot 1 determines that the work end condition is satisfied.

Figure 8:
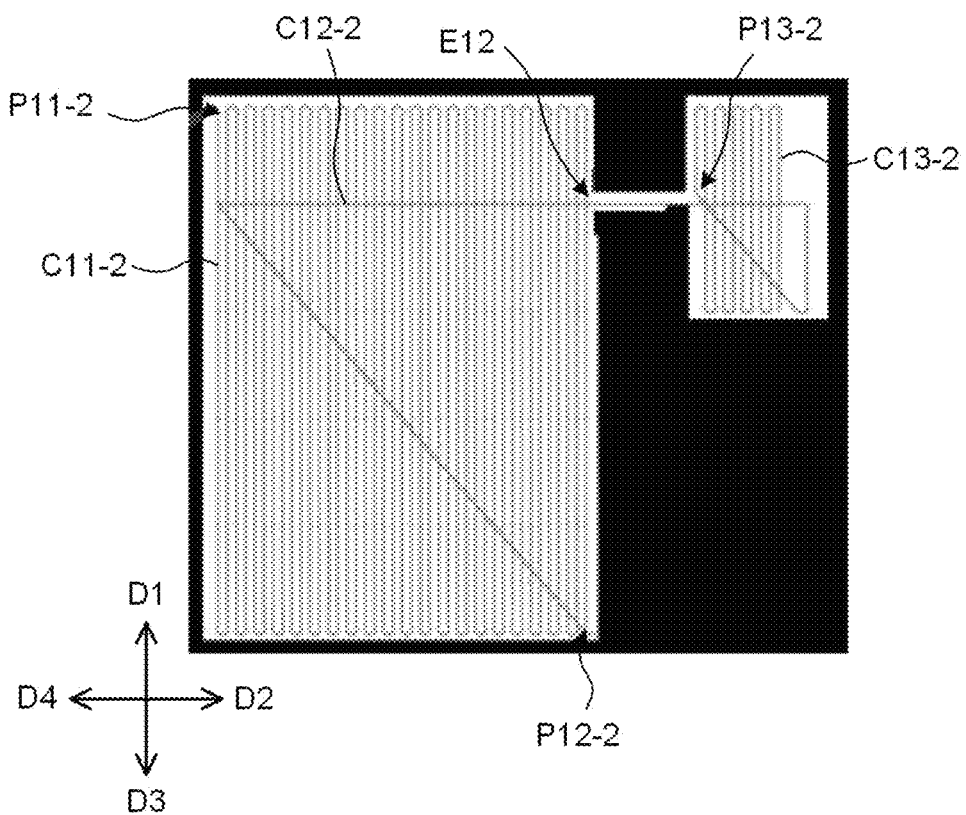
FIG. 8 is a diagram illustrating an example of a route set by the second route setting method.

FIG. 8 gives an example of a work route set in the work target area A10 by the second route setting method.

FIG. 8 is a diagram illustrating an example of a route set by the second route setting method. In the example of FIG. 8, the setting unit 113 sets a work route C11-2 starting in the direction D3 from the same start point P11-2 as in the example of FIG. 7, turning around while shifting in the direction D2 when reaching a boundary, shifting in the direction D2 while going back and forth in the direction D1 and the direction D3, and then reaching an end point P12-2.

The setting unit 113 also sets a movement route C12-2 passing the passageway E12 from the end point P12-2 to a start point P13-2 in the partial area A13, and sets a work route C13-2 for the partial area A13. When the second route setting method is used, the object detection unit 112 resets the work route each time a certain distance is traveled. Here, for reference, a comparison is given of processing loads when a route is set by the first route setting method for the entire work target area A10 and when a route is set by the second route setting method for the entire work target area A10.

FIG. 9 is a diagram illustrating processing loads in the work target area A10. FIG. 9 illustrates the number of steps and processing time when the process of setting the work route is performed in the work target area A10. For each item, the larger the value, the greater the processing load. In more detail, from a start point of a work route for an entire work target area to when the work end condition is satisfied is referred to as one episode, and 500 episodes were conducted while learning was performed of the NN and NXCS used in the first route setting method and the second route setting method from unlearned states.

Illustrated are results of the best (minimum number of steps) and worst (maximum number of steps) trials in 10 trials and the average number of steps for the 10 trials, where execution of 500 episodes is regarded as one trial. In the cases of the first route setting method, the minimum number of steps was 2353.0, the maximum number of steps was 8139.0, the average number of steps was 2752.3, and the average processing time was 984.7 seconds. In the cases of the second route setting method, the minimum number of steps was 2366.0, the maximum number of steps was 30076.0, the average number of steps was 17243.6, and the average processing time was 1406.8 seconds.

In the second route setting method, the average number of steps and the average processing time were larger than in the first route setting method because it was difficult in the second route setting method to set the movement route to the next partial area. On the other hand, in the first route setting method, traveling could be efficiently performed according to the rules 1-6, the average number of steps and the average processing time were both smaller than those in the second route setting method. Thus, a processing load of the first route setting method is likely to be smaller than a processing load of the second route setting method.

The lawn mowing robot 1 sets the work route only by the first route setting method in the case of the work target area A10, and therefore the processing load of the route setting is smaller than when the second route setting method is used. Thus, the lawn mowing robot 1 basically uses the first route setting method with a small processing load and uses the second route setting method with a large processing load only when the switch condition is satisfied, thereby reducing the processing load in work route setting compared with a case where the second route setting method is used for the basic processing.

Next, a description will be given of a case where switching occurs to the second route setting method.

Figure 10:
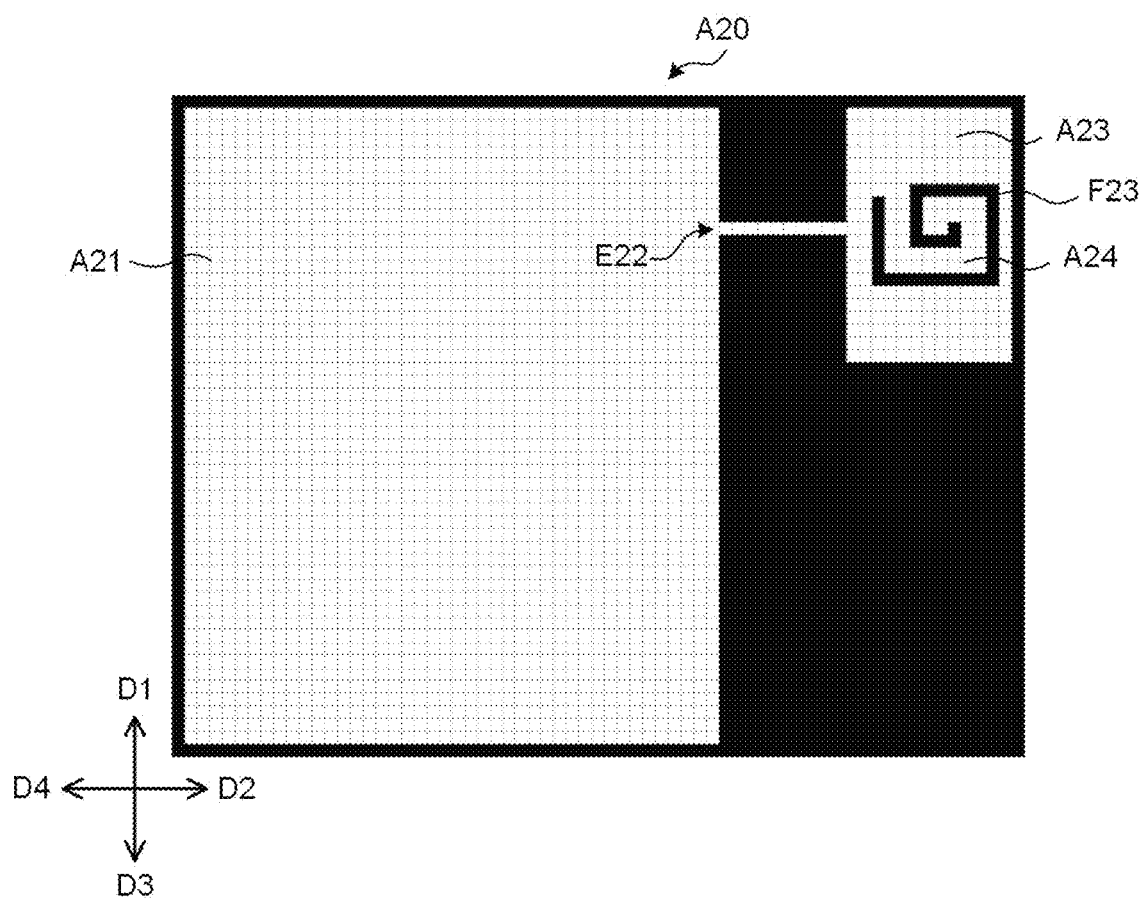
FIG. 10 is a diagram illustrating a second example of a work target area.

FIG. 10 is a diagram illustrating a second example of a work target area. FIG. 10 represents a work target area A20 including a rectangular partial area A21 and a partial area A23 connected to the partial area A21 by a passageway E22. The partial area A23 includes a spiral wall F23 and an interior area A24 of the wall F23. FIG. 10 represents the same directions D1-D4 as in FIG. 2.

Figure 11:
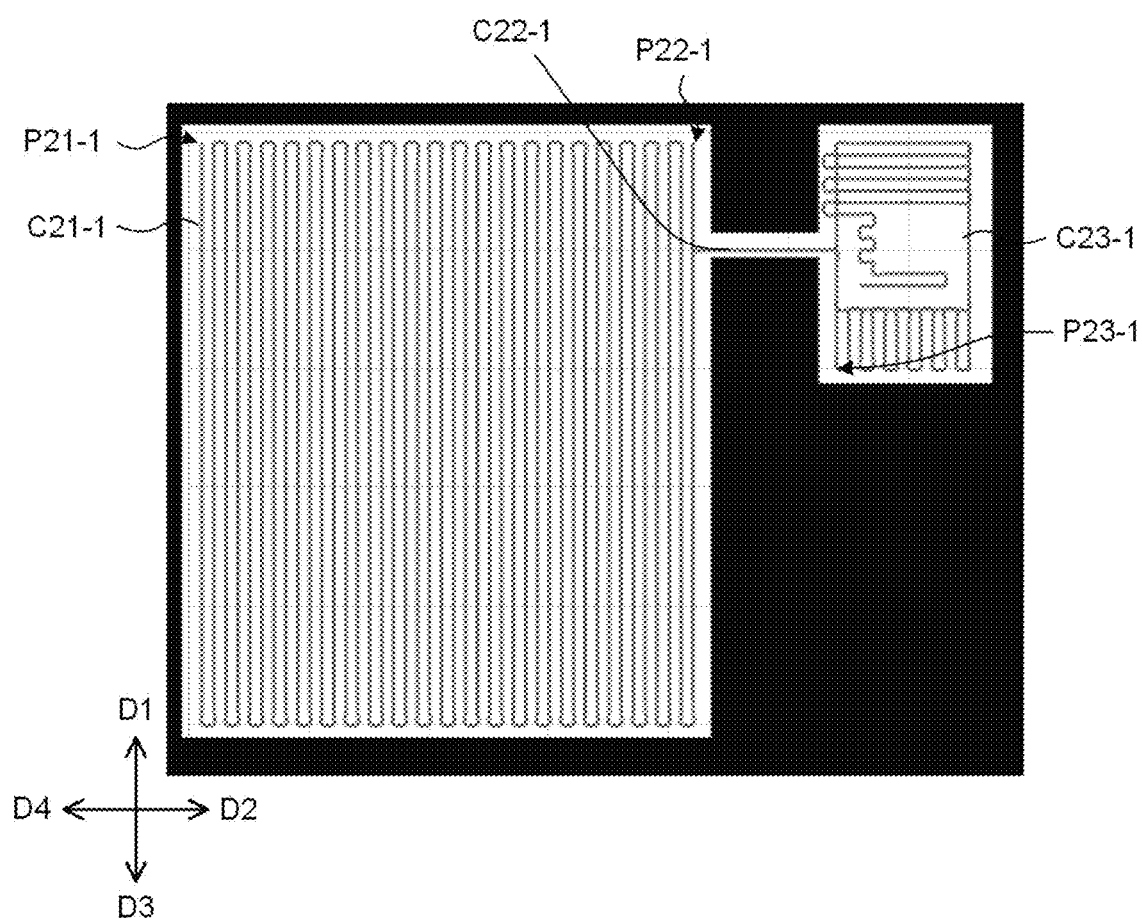
FIG. 11 is a diagram illustrating an example of a route set by the first route setting method.

FIG. 11 is a diagram illustrating an example of a route set by the first route setting method. In the example of FIG. 11, the setting unit 113 sets the work route with a corner in the direction D1 and the direction D4 in the partial area A21 as a start point P21-1. From the start point P21-1, the setting unit 113 sets a work route C21-1 based on the above-mentioned rule 3 (initial direction=direction D3, turning around direction=direction D2). In the work route C21-1, an end point P22-1 at an end of the partial area A21 is set as the end point of the work route.

The setting unit 113 sets a movement route C22-1 passing through the passageway E22 and sets a work route C23-1 in a partial area A23 from a start point P23-1 in the partial area A23. As represented in FIG. 11, by the first route setting method, the route is not set deep into the interior area A24 of the spiral wall F23. In contrast, by the second route setting method, a route can be set to the deep into the interior area A24.

Figure 12:
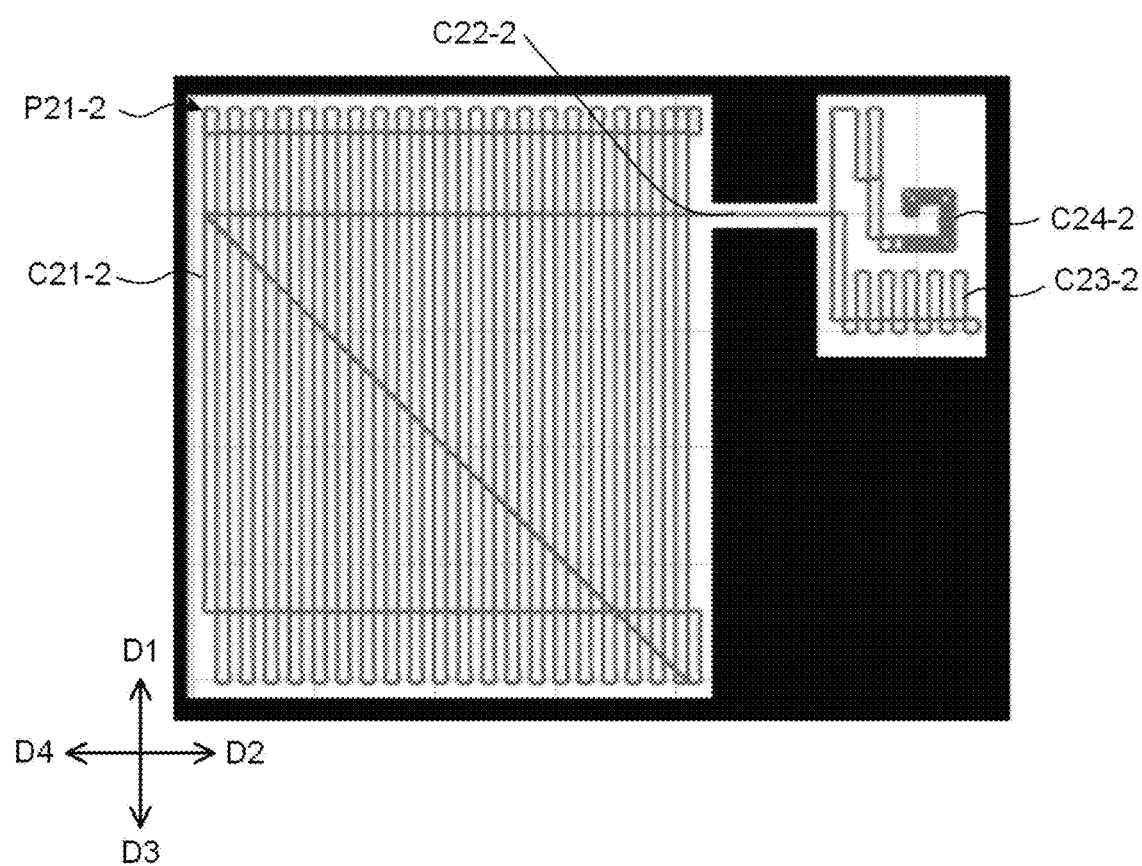
FIG. 12 is a diagram illustrating an example of a route set by the second route setting method.

FIG. 12 is a diagram illustrating an example of a route set by the second route setting method. In the example of FIG. 12, the setting unit 113 sets a work route C21-2 for traveling the entire inner side of the partial area A21 from a start point P21-2 at the corner in the direction D1 and the direction D4. The setting unit 113 further sets a movement route C22-2 from the partial area A21 to the partial area A23 through the passageway E22 and sets a work route C23-2 in the partial area A23. Furthermore, the setting unit 113 sets a work route C24-2 leading to the deep into the interior area A24 of the spiral wall F23.

Figure 13:
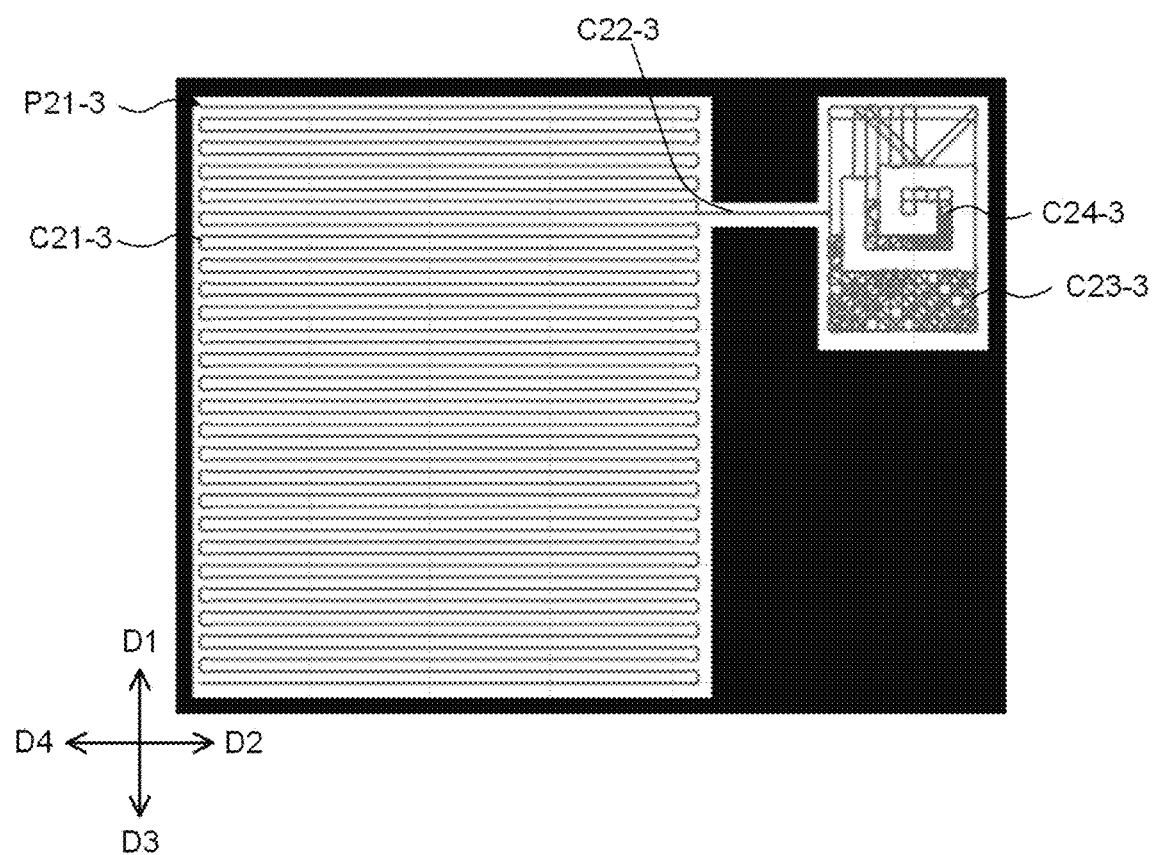
FIG. 13 is a diagram illustrating an example of a route set by the route setting process.

FIG. 13 is a diagram illustrating an example of a route set by the route setting process. In the example of FIG. 13, the setting unit 113 sets a work route C21-3 from a start point P21-3 at the corner in the direction D1 and the direction D4, using the rule 2 (initial direction=direction D2, turning around direction=direction D3) of the first route setting method. The setting unit 113 further sets a movement route C22-3 for moving from an end point of the work route C21-3 to the partial area A23. Then, the setting unit 113 sets a work route C23-3 in the partial area A23 and a work route C24-3 leading to the deep in the interior area A24 of the wall F23 by using the second route setting method.

In the case of the work target area A20, the partial area A23 includes the wall F23 as an obstacle, and thus the switch condition from the first route setting method to the second route setting method is satisfied in partial area A23. Therefore, the setting unit 113 sets the work route in both the partial area A21 and the partial area A23 by the first route setting method for the first time, and sets the work route in the partial area A23 by the second route setting method for the second and subsequent times. By switching the route setting method in this way, an unreached area can be reduced compared with a case where no switching is performed.

FIG. 14 is a diagram illustrating processing loads in a second example. In FIG. 14, the number of steps and processing time are represented for the process of setting the work route in the work target area A20. FIG. 14 illustrates the results of the best (minimum number of steps) and worst (maximum number of steps) trials in 10 trials and the average number of steps for the 10 trials where execution of 500 episodes is regarded as one trial. In the cases of the first route setting method, the minimum number of steps was 2433.0, the maximum number of steps was 8059.8, the average number of steps was 2908.3, and the average processing time was 7458.3 seconds. In the cases of the second route setting method, the minimum number of steps was 2386.7, the maximum number of steps was 30054.7, and the average number of steps was 17131.2, and the average processing time was 85616.8 seconds.

When the first route setting method was used in the partial area A21 and the second route setting method was used in the partial area A23, the minimum number of steps was 2460.7, the maximum number of steps was 12881.7, the average number of steps was 5580.8, and the average processing time was 50605.1 seconds. As described above, using only the first route setting method reduces the processing load but is likely to leave the more unreached area. Using only the second route setting method reduces the unreached area but increases the processing load. Therefore, in the present embodiment, the first route setting method is basically used, but the second route setting method is used depending on the area.

This reduces the unreached area while at the same time hindering the increase in the processing load. In particular, when an autonomous work machine such as the lawn mowing robot 1 includes a hardware resource for information processing, a resource amount is limited, and therefore a processable load is likely to have an upper limit. According to the present embodiment, even when the processing load has such an upper limit, using the first route setting method or the second route setting method depending on the situation can reduce an unreached area and improve a likelihood of setting a route with high work quality in a work area.

4. Others

The following may be adopted to the work machine exemplified by the lawn mowing robot 1.

(1) Although the above embodiment is described as having a configuration of the lawn mowing robot 1, a program may be provided that allows a computer to execute each step of the information processing system (each step represented in FIG. 5). The computer may be provided on the lawn mowing robot 1 or on an external apparatus such as a server, cloud computing resource, etc. that is separate from the lawn mowing robot 1.

(2) In the embodiment, the neural network (NN) and the neural-network XCS (NXCS) are used as machine learning methods for the models for setting an optimal route, but other machine learning methods may be used. For example, the other machine learning methods may include an extended classifier system (XCS), a support vector machine (SVM), deep learning, convolutional neural network (CNN), recurrent neural network (RNN), principal component analysis (PCA), etc.

(3) In the embodiment, the setting unit 113 uses a route setting method of setting a route on the basis of a trained model trained by a machine learning method, but a route setting method defined without using machine learning may also be used. Such a route setting method includes, for example, a method of setting a route by a human-considered algorithm, a route setting method created by an artificial intelligence (AI) method other than machine learning, or the like.

(4) The determination unit 114 may use a switch condition different from the switch condition in the embodiment. For example, the determination unit 114 may determine whether or not the switch condition is satisfied depending on a set length of the work route. Generally, the shorter the length of the work route, the lower the power consumption of the work machine and the higher the work quality. Therefore, the determination unit 114, for example, calculates a total length of an ideal work route with no overlap of work routes, and then calculates a ratio of the length of the set work route to the total length. The closer this ratio to 1, the higher the work quality, and the further the ratio from 1, the lower the work quality. The determination unit 114 determines that the switch condition is satisfied when the calculated ratio is equal to or greater than a threshold value.

The determination unit 114 may determine whether or not the switch condition is satisfied depending on the number of directional changes in a set work route. Generally, the smaller the number of directional changes, the less time is lost during directional changes and the higher the work quality. Therefore, the determination unit 114, for example, calculates the number of directional changes in the work route with the minimum number of directional changes, and calculates a ratio of the number of directional changes in the set work route to the minimum number. The closer this ratio to 1, the higher the work quality, and the further the ratio from 1, the lower the work quality. The determination unit 114 determines that the switch condition is satisfied when the calculated ratio is equal to or greater than a threshold value.

The determination unit 114 may determine whether or not the switch condition is satisfied depending on a proportion of a reached area included in the set work routes. The above-mentioned proportion of reached area refers to an area having actually been reached by the work machine that has traveled the entire set work route. The smaller the proportion of reached area, the less wasteful traveling and the higher the work quality. The determination unit 114 calculates the proportion of reached area by, for example, detecting a load amount of the motor for allowing the blade disk to rotate, the motor being provided on the work machine.

The load amount of the motor is maximum in cutting grass of a full width of the blade disk, and becomes smaller as the more reached area is included within the width of the blade disk. For example, the determination unit 114 creates a graph that maps a traveled distance to the load amount of the motor and determines that the switch condition is satisfied when an area of the sum of differences from the maximum load amount of the motor is equal to or greater than a threshold value. Alternatively, it may be determined that the switch condition is satisfied when an accumulated distance to be retraveled in the reached area reaches a threshold value.

The determination unit 114 may reduce the thus accumulated distance depending on a distance traveled in the unreached area. The determination unit 114 calculates the distance traveled in the unreached area by detecting the above-mentioned load amount of motor. This reduces possibility that the route setting method switches in the middle of the work route even though the quality of the work route is gradually improving, as compared with a case where the accumulated distance is not reduced.

The determination unit 114 may similarly makes a determination by accumulating a time of retraveling the reached area instead of the above-mentioned distance. The determination unit 114 may determine that the switch condition is satisfied when a degree of complexity of a shape of a boundary detected by the boundary detection unit 111 exceeds a predetermined standard. This is because the more complex the shape of the boundary, the more difficult it may be to set a route with good work quality using a rule used in the first route setting method.

That is, the determination unit 114 may use, as the switch condition, a condition satisfied in situations where it is likely to be difficult to set a good route by the first route setting method. Furthermore, the determination unit 114 may use, as the switch condition, a condition satisfied in situations where it is difficult to set a good route by the first route setting method but is likely to be able to set a good route by the second route setting method. Using such a switch condition can improve a likelihood that a route with high work quality in a work area is set, as in the embodiment.

(5) The setting unit 113 may use a work end condition different from the work end condition in the embodiment. For example, the setting unit 113 may use, as the work end condition, a condition satisfied when a predetermined time has elapsed or a condition satisfied when the battery of the work machine is reduced to a predetermined amount. In short, the setting unit 113 may use, as the work end condition, a condition satisfied in a situation such that work in a work target area can be said to have been generally completed.

(6) The work performed by the work machine is not limited to lawn mowing, but may be, for example, plowing, fertilizer spreading, or chemical spraying by an autonomous agricultural robot, or cleaning by an autonomous vacuum cleaner robot.

In addition, each of the following aspect may be provided.

The information processing system, wherein a processing load of the first method is likely to be smaller than a processing load of the second method.

The information processing system, wherein the first method is a method of setting a continuous route in accordance with a rule whereby the work machine repeats travel and a directional change at a boundary of the work area.

The information processing system, wherein the first method: has a plurality of the rules that differ from each other in at least one of an initial travel direction and a direction after the directional change, and selects one that provides best work quality in the plurality of the rules and thereby sets the route.

The information processing system, wherein the work quality is represented by one of a length of the set route, number of directional changes in the route, and a proportion of a reached area in the route.

The information processing system, wherein a proportion of the unreached area or the reached area is calculated by detecting a load amount on a motor included in the work machine.

The information processing system, configured to further execute a detection step of detecting an object in the work area, wherein the second method is a method of resetting, based on the acquired boundary information and a position of the detected object, the route each time the work machine travels a predetermined distance.

The information processing system, wherein based on trained models respectively trained by different machine learning methods, the first method and the second method set a route.

The information processing system, wherein the first method uses a machine learning method using a neural network that can select a route from two or more types of patterned routes, and the second method uses a machine learning method using a classifier system.

The information processing system, wherein work performed by the work machine is lawn mowing.

An autonomous work machine configured to execute each step of the information processing system.

A program allowing a computer to execute each step of the information processing system.

Of course, the present disclosure is not limited to these.

Finally, various embodiments of the present disclosure have been described, but these are presented as examples and are not intended to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the invention described in claims and the equivalent scope thereof.

What is claimed is:

1. An information processing system comprising a processor configured to execute:
   an acquisition step of acquiring boundary information representing a boundary of a work area targeted by an autonomous work machine;
   a setting step of setting, based on the acquired boundary information, a route, on which the autonomous work machine travels, for minimizing an unreached area in the work area by one of a first method and a second method;
   a supply step of supplying route information indicating the route to a travel controller, the travel controller being configured to control the travel of the autonomous work machine based on the route information; and
   a determination step of determining whether work quality satisfies a predetermined condition when the travel controller causes the autonomous work machine to travel along the route set by the first method,
   wherein, when the work quality satisfies the predetermined condition while the autonomous work machine travels along the route set by the first method, the travel controller causes the autonomous work machine to keep traveling along the route set by the first method,
   when the work quality does not satisfy the predetermined condition while the autonomous work machine travels along the route set by the first method, the travel controller causes the autonomous work machine to not travel along the route set by the first method and causes the autonomous work machine to travel along the route set by the second method, and
   the first method uses a machine learning method using a neural network that selects the route from two or more types of patterned routes, and the second method uses a machine learning method using a classifier system.

2. The information processing system according to claim 1,
   wherein a processing load of the first method is smaller than a processing load of the second method.

3. The information processing system according to claim 2,
   wherein the first method is a method of setting a continuous route in accordance with a rule whereby the autonomous work machine repeats the travel and a directional change at the boundary of the work area.

4. The information processing system according to claim 3,
   wherein the first method:
      has a plurality of the rules that differ from each other in at least one of an initial travel direction and a direction after the directional change; and
      selects one that provides best work quality in the plurality of the rules and thereby sets the route.

5. The information processing system according to claim 1,
   wherein the work quality is represented by one of a length of the set route, a number of the directional changes in the route, and a proportion of a reached area in the route.

6. The information processing system according to claim 5,
   wherein a proportion of the unreached area or the proportion of the reached area is calculated by detecting a load amount on a motor included in the autonomous work machine.

7. The information processing system according to claim 1, wherein:
   the processor is configured to further execute a detection step of detecting an object in the work area; and
   the second method is a method of resetting, based on the acquired boundary information and a position of the detected object, the route each time the autonomous work machine travels a predetermined distance.

8. The information processing system according to claim 1,
   wherein work performed by the autonomous work machine is lawn mowing.

9. The information processing system according to claim 1,
   wherein, in the setting step, the route of the autonomous work machine is set for each of a plurality of partial areas included in the work area, and the plurality of partial areas include a first partial area followed by a second partial area,
   in a determination step, it is determined whether the work quality satisfies the predetermined condition when the travel controller causes the autonomous work machine to travel along the route in the first partial area set by the first method, and in the setting step, when the work quality does not satisfy the predetermined condition, the route in the second partial area is set by the second method.

10. The information processing system according to claim 1, wherein the work quality is represented by a size of an area in the work area in which work by the autonomous work machine is completed per unit time.

11. The information processing system according to claim 1, wherein, when the work quality does not satisfy the predetermined condition while the autonomous work machine travels along the route set by the first method, the route is set by the second method in the setting step, and when a switching condition is satisfied after the autonomous work machine travels the route set by the second method, the route is set by the first method so that the autonomous work machine travels the route set by the first method.

12. An autonomous work machine comprising:
a housing; and
a processor housed in the housing, the processor is configured to execute:
an acquisition step of acquiring boundary information representing a boundary of a work area targeted by the autonomous work machine;
a setting step of setting, based on the acquired boundary information, a route, on which the autonomous work machine travels, for minimizing an unreached area in the work area by one of a first method and a second method;
a supply step of supplying route information indicating the route to a travel controller, the travel controller being configured to control the travel of the autonomous work machine based on the route information; and
a determination step of determining whether work quality satisfies a predetermined condition when the travel controller causes the autonomous work machine to travel along the route set by the first method,
wherein, when the work quality satisfies the predetermined condition while the autonomous work machine travels along the route set by the first method, the travel controller causes the autonomous work machine to keep traveling along the route set by the first method,
when the work quality does not satisfy the predetermined condition while the autonomous work machine travels along the route set by the first method, the travel controller causes the autonomous work machine to not travel along the route set by the first method and causes the autonomous work machine to travel along the route set by the second method, and
the first method uses a machine learning method using a neural network that selects the route from two or more types of patterned routes, and the second method uses a machine learning method using a classifier system.

13. The autonomous work machine according to claim 12, wherein the work quality is represented by one of a length of the set route, a number of the directional changes in the route, a proportion of a reached area in the route, and a size of an area in the work area in which work by the autonomous work machine is completed per unit time.

14. The autonomous work machine according to claim 13, wherein a proportion of the unreached area or the proportion of the reached area is calculated by detecting a load amount on a motor included in the autonomous work machine.

15. The autonomous work machine according to claim 12, wherein the processor is further configured to execute a detection step of detecting an object in the work area, and the second method is a method of resetting, based on the acquired boundary information and a position of the detected object, the route each time the autonomous work machine travels a predetermined distance.

16. A non-transitory computer-readable storage medium storing a program causing a computer to execute a process by a processor so as to perform:
an acquisition step of acquiring boundary information representing a boundary of a work area targeted by an autonomous work machine;
a setting step of setting, based on the acquired boundary information, a route, on which the autonomous work machine travels, for minimizing an unreached area in the work area by one of a first method and a second method;
a supply step of supplying route information indicating the route to a travel controller, the travel controller being configured to control the travel of the autonomous work machine based on the route information; and
a determination step of determining whether work quality satisfies a predetermined condition when the travel controller causes the autonomous work machine to travel along the route set by the first method,
wherein, when the work quality satisfies the predetermined condition while the autonomous work machine travels along the route set by the first method, the travel controller causes the autonomous work machine to keep traveling along the route set by the first method,
when the work quality does not satisfy the predetermined condition while the autonomous work machine travels along the route set by the first method, the travel controller causes the autonomous work machine to not travel along the route set by the first method and causes the autonomous work machine to travel along the route set by the second method, and
the first method uses a machine learning method using a neural network that selects the route from two or more types of patterned routes, and the second method uses a machine learning method using a classifier system.

17. The non-transitory computer-readable storage medium according to claim 16, wherein the work quality is represented by one of a length of the set route, a number of the directional changes in the route, a proportion of a reached area in the route, and a size of an area in the work area in which work by the autonomous work machine is completed per unit time.

18. The non-transitory computer-readable storage medium according to claim 17, wherein a proportion of the unreached area or the proportion of the reached area is calculated by detecting a load amount on a motor included in the autonomous work machine.

19. The non-transitory computer-readable storage medium according to claim 16, wherein the processor is further configured to execute a detection step of detecting an object in the work area, and the second method is a method of resetting, based on the acquired boundary information and a position of the detected object, the route each time the autonomous work machine travels a predetermined distance.

* * * * *